United States Patent [19]

Najafi et al.

[11] Patent Number: 5,080,503
[45] Date of Patent: Jan. 14, 1992

[54] OPTICAL WAVEGUIDE DEVICE AND METHOD FOR MAKING SUCH DEVICE

[75] Inventors: Seyed-Iraj Najafi, Dollard des Ormeaux; Kenneth O. Hill, Kanata; John F. Currie, Montreal, all of Canada

[73] Assignee: Ecole Polytechnique, Montreal, Canada

[21] Appl. No.: 593,262

[22] Filed: Oct. 1, 1990

Related U.S. Application Data

[63] Continuation of Ser. No. 448,843, Dec. 12, 1989, abandoned.

[51] Int. Cl.$^5$ ............................................. G02B 6/10
[52] U.S. Cl. ................................................. 385/1
[58] Field of Search ................................. 350/96.12

[56] References Cited

U.S. PATENT DOCUMENTS 4,695,121  9/1987  Mahapatra et al. ............. 350/96.12
4,725,110  2/1988  Glenn et al. ..................... 350/96.23

OTHER PUBLICATIONS

"New Design Concept for a Narrowband Wavelength-Selective Optical Tap and Combiner", *Electronics Letters*, Jun. 18, 1987, vol. 23, No. 13, pp. 668–669.
"Planar, Buried, Ion-Exchanged Glass Waveguides: Diffusion Characteristics", by Ramu V. Ramaswamy et al., *IEEE Journal of Quantum Electronics*, vol. QE-22, No. 6, Jun. 1986, pp. 883–891.

*Primary Examiner*—William L. Sikes
*Assistant Examiner*—Robert E. Wise
*Attorney, Agent, or Firm*—Foley & Lardner

[57] ABSTRACT

The present disclosure describes an optical waveguide device and a method for making such device. The device comprises a substrate; a waveguide embedded in the substrate, the waveguide having a refractive index higher than the refractive index of the substrate; and first and second optical mirrors placed respectively in two different positions along the waveguide. The method comprises steps of (a) cleaning a substrate by means of a cleaning agent; (b) embedding a waveguide in the substrate; and (c) placing first and second optical mirrors respectively at two different positions in the substrate, the steps (b) and (c) being performed in such a manner that the mirrors being positioned along the waveguide.

18 Claims, 2 Drawing Sheets

OPTICAL WAVEGUIDE DEVICE AND METHOD FOR MAKING SUCH DEVICE

This application is a continuation of application Ser. No. 07/448,843, filed Dec. 12, 1989, now abandoned.

FIELD OF THE INVENTION

The present invention relates to an optical waveguide device and a method for producing such device. More particularly, the present invention relates to an optical waveguide device which can be used to make non-linear optical devices such as logic gates, switches and modulators. The present device can also be used to make lasers and tap and combiner devices. The present invention may have many applications in optical communication, optical signal processing systems and optical sensors.

BACKGROUND OF THE INVENTION

There are many nonlinear optical devices such as a laser which comprises a waveguide disposed between two optical mirror devices. This kind of laser is very difficult to mass-produced.

It is an object of the present invention to provide an optical waveguide device which can be mass-produced.

It is another object of the present invention to provide an optical waveguide device which has a small size.

It is another object of the present invention to provide an optical waveguide device which requires a very low-threshold light power.

SUMMARY OF THE INVENTION

According to the present invention, there is provided an optical waveguide device comprising:
a substrate;
a waveguide embedded in said substrate, said waveguide having a refractive index higher than the refractive index of said substrate; and
first and second optical mirrors placed respectively in two different positions along said waveguide.

According to the present invention, there is also provided a method for making an optical waveguide device, comprising steps of:
a) cleaning a substrate by means of a cleaning agent;
b) embedding a waveguide in said substrate, said waveguide having a refractive index higher than the refractive index of said substrate; and
c) placing first and second optical mirrors respectively at two different positions in said substrate, said steps (b) and (c) being performed in such a manner that said mirrors being positioned along said waveguide.

The objects, advantages and other features of the present invention will become more apparent upon reading of the following non restricted description of preferred embodiments thereof, given for the purpose of examplification only with reference to the accompanying drawings.

DETAILED DESCRIPTION OF PREFERRED EMBODIMENTS

Figure 1:
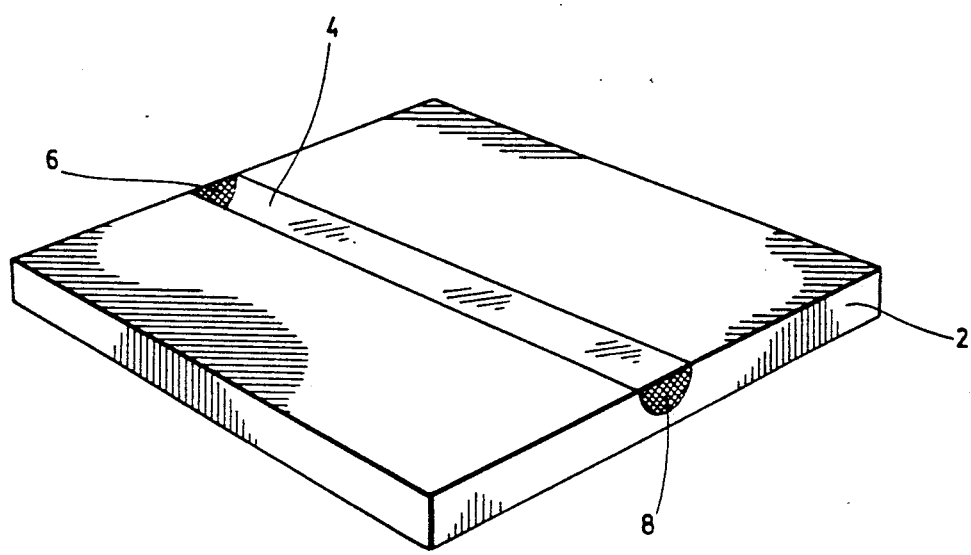
FIG. 1 is a view in perspective of one embodiment of an optical waveguide device according to the present invention.

In FIG. 1, there is shown an optical waveguide device comprising a substrate 2 and a waveguide 4 embedded in the substrate 2. The waveguide 4 has a refractive index higher than the refractive index of the substrate 2. The device also comprises first and second optical mirrors 6 and 8 secured respectively at both ends of said waveguide 4.

In a first embodiment of the optical waveguide device shown in FIG. 1, the substrate 2 is made of glass and contains a rare-earth element.

In a second embodiment of the optical waveguide device shown in FIG. 1, the substrate 2 is made of glass and free from rare-earth element, and the waveguide 4 contains a rare-earth element.

Figure 2:
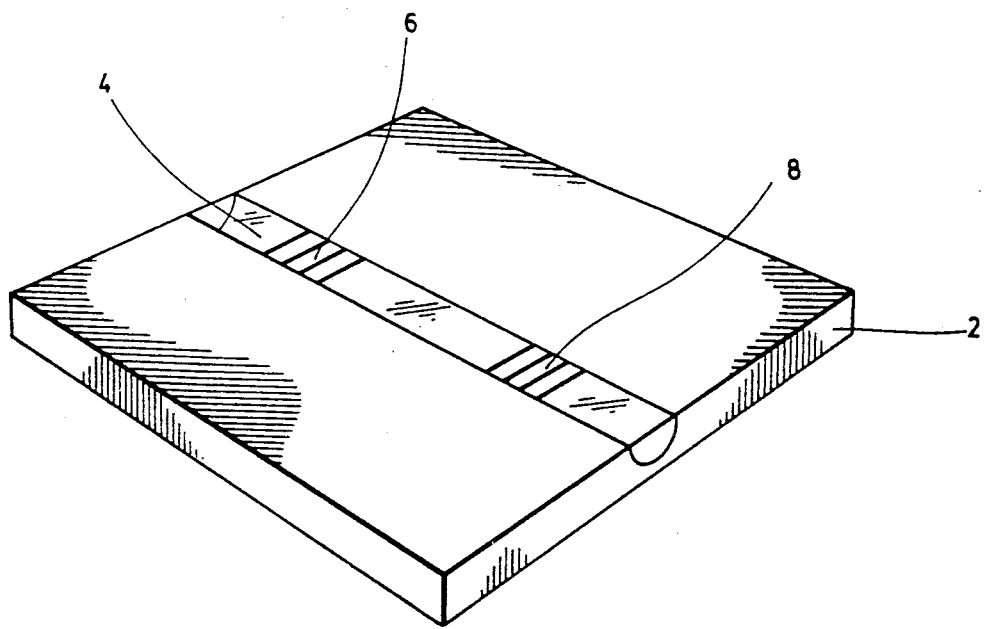
FIG. 2 is a view in perspective of another embodiment of an optical waveguide device according to the present invention.
Figure 3:
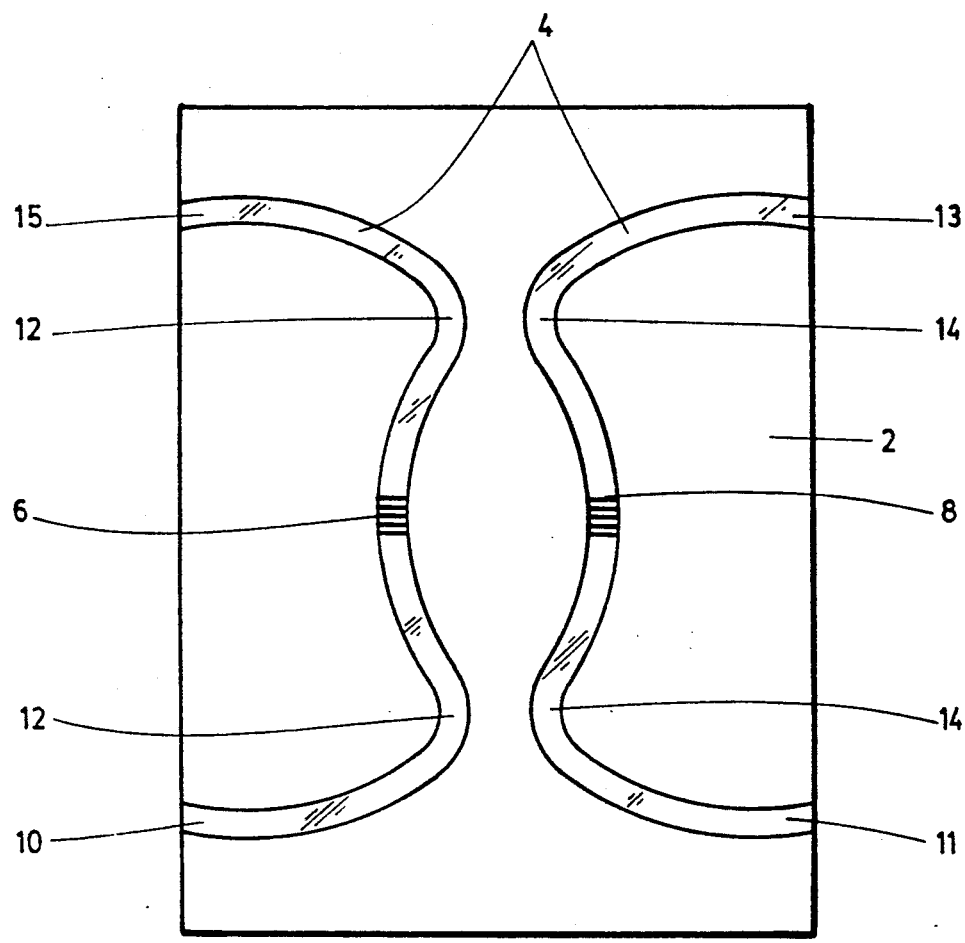
FIG. 3 is a view from above of another embodiment of an optical waveguide device according to the present invention.

In FIGS. 2 and 3, there are shown different embodiments of an optical waveguide device according to the present invention. These embodiments comprise a substrate 2 and a waveguide 4 embedded in the substrate 2. The waveguide 4 has a refractive index higher than the refractive index of the substrate 2. They also comprise first and second optical mirrors 6 and 8 which are placed respectively in the two different positions along the waveguide 4. These first and second optical mirrors 6 and 8 are respectively first and second gratings. These gratings contain a rare-earth element. The gratings are defined by the Bragg resonant equation which is:

$$\Lambda = \frac{\lambda}{2N}$$

where $\Lambda$ is the period of the gratings, $\lambda$ is the emission wavelength of the rare-earth element, and N is the effective index of the waveguide 4. The first and second gratings have respectively a refractive index different from the refractive index of the waveguide 4.

In a first embodiment of the optical waveguide device shown in FIG. 2, the substrate 2 is made of glass and contains the rare-earth element, and the waveguide 4 contains the rare-earth element.

In a second embodiment of the optical waveguide device shown in FIG. 2, the substrate 2 is made of glass and free from the rare-earth element, and the waveguide 4 contains the rare-earth element.

In a third embodiment of the optical waveguide device shown in FIG. 2, the substrate 2 is made of glass and free from the rare-earth element, and the waveguide 4 is free from the rare-earth element. The grating 8 contains the rare-earth element.

In the three embodiments of the optical waveguide device shown in FIG. 2, the refractive index of the first grating is substantially similar to the refractive index of the second grating.

In the embodiment of the optical waveguide device shown in FIG. 3, the waveguide comprises two longitudinal waveguide sections. Each section has two extremities 10, 11, 13 and 15 adjacent to the edge of the substrate 2. One section has two distinct areas 12 adjacent to two distinct areas 14 of the other section. The two different positions of the gratings being situated respectively on each waveguide section 4 between its two distinct areas 12 and 14. The waveguide 4 is free from the rare-earth element, and the substrate 2 is made of glass and free from the rare-earth element. The grating 8 contains the rare-earth element.

The method for making the first embodiment of the optical waveguide device shown in FIG. 1, comprises steps of cleaning a substrate by means of a cleaning agent, embedding a waveguide in the substrate, and securing first and second optical mirrors respectively at both ends of the waveguide. The substrate is made of glass and doped with a rare-earth element. The step of embedding comprises steps of depositing a film onto the surface of the substrate by an evaporation process; forming a mask by making openings in the film to expose parts of the surface; immersing the substrate in a bath of molten salt to form the waveguide by diffusion of the rare-earth element; and removing the mask from the surface. The mask is formed by a photolithographic process.

The method for making the second embodiment of the optical waveguide device shown in FIG. 1, comprises steps of cleaning a substrate by means of a cleaning agent, embedding a waveguide in the substrate, and securing first and second optical mirrors respectively at both ends of the waveguide. The substrate is made of glass and free from rare-earth element. The embedding step comprises steps of depositing a film onto the surface of the substrate by an evaporation process; forming a mask by making openings in the film to expose parts of the surface; immersing the substrate in a bath of molten salt containing the rare-earth element to form the waveguide by diffusion of the rare-earth element; and removing the mask from the surface. The mask is formed by a photolithographic process.

The method for making the first embodiment of the optical waveguide device shown in FIG. 2, comprises steps of cleaning a substrate by means of a cleaning agent, embedding a waveguide in the substrate, and placing first and second optical mirrors at two different positions along the waveguide. The embedding process comprises steps of depositing a first film onto the surface of the substrate by an evaporatin process, forming a first mask by making openings in the first film to expose first parts of the surface, immersing the substrate in a first bath of molten salt to form the waveguide by diffusion, and removing the first mask from the surface. The first mask is formed by a photolithographic process.

The process for positioning the mirrors comprises steps of depositing a second film onto the surface by an evaporation process, forming a second mask by making openings in the second film to expose two second parts of the surface, and immersing the substrate in a second bath of molten salt to change the refraction index of the glass in the two second parts to form first and second gratings containing a rare-earth element. The second mask is formed by a photolithographic process. The two second parts are situated at two different positions along the waveguide. The first and second gratings constitute the first and second mirrors. The gratings are defined by the Bragg resonant equation which is:

$$\Lambda = \frac{\lambda}{2N}$$

where $\Lambda$ is the period of the gratings, $\lambda$ is the emission wavelength of the rare-earth element, and $N$ is the effective index of the waveguide. The first and second gratings have a refractive index different from the refractive index of the waveguide. The second bath of molten salt has a temperature lower than the temperature of the first bath to prevent modification in the dimensions of the waveguide.

The substrate 2 is doped with the rare-earth element. The molten salt of the first bath is different from the molten salt of the second bath to produce respectively different refractive indexes in the gratings and in the waveguide. The openings of the second mask are perpendicular to the waveguide. The method also comprises, after the removing of the first mask from the surface and before the deposition of the second mask onto the surface, a step of immersing the substrate in a third bath of molten salt to bury the waveguide.

The method for making the second embodiment of the optical waveguide device shown in FIG. 2, comprises steps of cleaning a substrate by means of a cleaning agent, embedding a waveguide in the substrate, and placing first and second optical mirrors at two different positions along the waveguide. The embedding process comprises steps of depositing a first film onto the surface of the substrate by an evaporation process, forming a first mask by making openings in the first film to expose first parts of the surface, immersing the substrate in a first bath of molten salt to form the waveguide by diffusion, and removing the first mask from the surface. The first mask is formed by a photolithographic process.

This process of placing first and second optical mirrors comprises steps of depositing a second film onto the surface by an evaporation process, forming a second mask by making openings in the second film to expose two second parts of the surface, and immersing the substrate in a second bath of molten salt to change the refraction index of the glass in the two second parts to form first and second gratings containing a rare-earth element. The second mask is formed by a photolithographic process. The two second parts are situated at two different positions along the waveguide. The first and second gratings constitute the first and second mirrors. The gratings being defined by the Bragg resonant equation. The first and second gratings have a refractive index different from the refractive index of the waveguide. The second bath of molten salt has a temperature lower than the temperature of the first bath to prevent modification in the dimensions of the waveguide. The molten salt of the first bath contains the rare-earth element. The diffusion performed when the substrate is immersed in the first bath of molten salt, is a diffusion of the rare-earth element.

The method for making the third embodiment of the optical waveguide device shown in FIG. 2, comprises steps of cleaning substrate by means of a cleaning agent, embedding a waveguide in the substrate and placing first and second optical mirrors (gratings) respectively at two different positions along the waveguide. The placing of the first and second gratings comprises steps of depositing a first film onto the surface of the substrate by an evaporation process, forming a first mask by making openings in the first film to expose two first parts of the surface, immersing the substrate in a first bath of molten salt to change the refractive index of said glass in the two first parts to form first and second gratings containing a rare-earth element, and removing the first mask from the surface. The first mask is formed by a photolithographic process. The two first parts are situated at two different positions in the substrate. The first and second gratings constitute the first and second mirrors. The gratings are defined by the Bragg resonant equation.

The waveguide embedding step is performed in such a manner that the mirrors are positioned along the waveguide. This embedding step comprises steps of depositing a second film onto the surface by an evaporation process, forming a second mask by making openings in the second film to expose second part of the surface, and immersing the substrate in a second bath of molten salt to form the waveguide by diffusion. The second mask is formed by a photolithographic process. The waveguide has a refractive index different from the refractive index of the first and second gratings. The second bath has a temperature lower than the temperature of the first bath to prevent modification in the dimensions of the gratings. The substrate and the waveguide are free from the rare-earth element.

The method for making the embodiment of the optical waveguide device shown in FIG. 3, comprises steps of cleaning a substrate by means of a cleaning agent, embedding a waveguide in the substrate and placing first and second optical mirrors (gratings) respectively at two different positions along the waveguide. The placing of the first and second gratings comprises steps of depositing a first film onto the surface of the substrate by an evaporation process, forming a first mask by making openings in the first film to expose two first parts of the surface, immersing the substrate in a first bath of molten salt to change the refractive index of said glass in the two first parts to form first and second gratings containing a rare-earth element, and removing the first mask from the surface. The first mask is formed by a photolithographic process. The two first parts are situated at two different positions in the substrate. The first and second gratings constitute the first and second mirrors. The gratings are defined by the Bragg resonant equation.

The waveguide embedding step is performed in such a manner that the mirrors are positioned along the waveguide. This embedding step comprises steps of depositing a second film onto the surface by an evaporation process, forming a second mask by making openings in the second film to expose second part of the surface, and immersing the substrate in a second bath of molten salt to form the waveguide by diffusion. The second mask is formed by a photolithographic process. The waveguide has a refractive index different from the refractive index of the first and second gratings. The second bath has a temperature lower than the temperature of the first bath to prevent modification in the dimensions of the gratings. The substrate and the waveguide are free from the rare-earth element. The second parts exposed by the second mask comprise two longitudinal sections, each section having two extremities adjacent to the edge of the substrate. One section has two distinct areas adjacent to two distinct areas of the other section. The two first parts exposed by the first mask comprise two portions of the second parts, said two portions being situated respectively on each section of the second parts, between its two distinct areas.

The optical waveguide device shown in FIG. 1 and in FIG. 2 can be used to produce a laser beam. These figures show a waveguide that is doped with a rare-earth element and provided with mirrors constituted by gratings. This waveguide can be pumped at one of the absortion wavelength of the rare-earth element, then, it can be used as a laser at the emission wavelength of the rare-earth element for which the mirrors are designed.

This laser with mirrors is easier to fabricate and can be used as low-threshold individual laser. This laser is also simpler to integrate with other component on one substrate.

The optical waveguide device shown in FIG. 3 can be used as a tap and combiner device. In operation, this tap and combiner device is pumped through port A 10 at one of the absorption wavelength of the rare-earth element. The gratings are designed to reflect at emission wavelength of the rare-earth element, $\lambda_1$. Therefore, $\lambda_1$ exits through port B 11, and $\lambda_0$ exits through port D 13.

Although, the present invention has been explained hereinabove by way of preferred embodiments thereof, it should be pointed out that any modifications to these embodiments, within the scope of the appended claims is not deemed to change or alter the nature and scope of the present invention.

The embodiments of the invention in which an exclusive property or privilege is claimed are defined as follows:

1. An optical waveguide device comprising:
    a substrate;
    an input port for receiving light;
    an output port through which light exits the device;
    a waveguide embedded in said substrate to direct light within the device, said waveguide having a refractive index higher than the refractive index of said substrate; and
    first and second optical mirrors placed respectively in two different positions along said waveguide.

2. A device according to claim 1, wherein said first and second optical mirrors are respectively first and second gratings which are embedded in said two different positions in said waveguide, said gratings containing a rare-earth element, said gratings being defined by the Bragg resonant equation which is:

$$\Lambda = \frac{\lambda}{2N},$$

where $\Lambda$ is a period of said gratings, $\lambda$ is an emission wavelength of said rare-earth element, and N is the effective index of said waveguide, said first and second gratings having respectively a refractive index different from the refractive index of said waveguide.

3. A device according to claim 2, wherein:
    said substrate is made of glass and contains said rare-earth element; and
    said waveguide contains said rare-earth element.

4. A device according to claim 3, wherein the refractive index of said first grating is substantially similar to the refractive index of said second grating.

5. A device according to claim 2, wherein:
    said substrate is made of glass and free from said rare-earth element; and
    said waveguide contains said rare-earth element.

6. A device according to claim 2, wherein said substrate is made of glass and free from said rare-earth element, and said waveguide is free from said rare-earth element.

7. A device according to claim 2, wherein:
    said waveguide comprises two longitudinal waveguide sections, each of said sections having two extremities adjacent to an edge of said substrate, one of said sections having two distinct areas adjacent to two distinct areas of the other of said sections, said two different positions of said gratings being situated respectively on each of said waveguide sections between its two distinct areas;
said waveguide is free from said rare-earth element; and
said substrate is made of glass and is free from said rare-earth element.

8. A device according to claim 1, wherein:
said substrate is made of glass and contains a rare-earth element; and
said first and second optical mirrors are secured respectively at both ends of said waveguide.

9. A device according to claim 1, wherein:
said substrate is made of glass and free from rare-earth earth element;
said waveguide contains a rare-earth element; and
said first and second optical mirrors are secured respectively at both ends of said waveguide.

10. A method for making an optical waveguide device, comprising steps of:
a) cleaning a substrate by means of a cleaning agent;
b) embedding a waveguide in said substrate, said waveguide having a refractive index higher than the refractive index of said substrate; and
c) placing first and second optical mirrors respectively at two different positions in said substrate, said steps (b) and (c) being performed to position said mirrors along said waveguide.

11. A method according to claim 10, wherein:
said substrate is made of glass;
said step (b) comprises steps of:
  i) depositing a first film onto a surface of said substrate by an evaporation process;
  ii) forming a first mask by making openings in said first film to expose first parts of said surface, said first mask being formed by a photolithographic process;
  iii) immersing said substrate in a first bath of molten salt to form said waveguide by diffusion; and
  iv) removing said first mask from said surface; and
said step (c) comprises steps of:
  v) depositing a second film onto said surface by an evaporation process;
  vi) forming a second mask by making openings in said second film to expose two second parts of said surface, said second mask being formed by a photolithographic process, said two second parts being situated at said two different positions, along said waveguide; and
  vii) immersing said substrate in a second bath of molten salt to change the refraction index of said glass in said two second parts to form first and second gratings containing a rare-earth element, said first and second gratings constituting said first and second mirrors, said gratings being defined by the Bragg resonant equation which is:

$$\Lambda = \frac{\lambda}{2N},$$

where $\Lambda$ is a period of said gratings, $\lambda$ is an emission wavelength of said rare-earth element, and N is an effective index of said waveguide, said first and second gratings having a refractive index different from the refractive index of said waveguide, said second bath of molten salt having a temperature lower than the temperature of said first bath to prevent modification in dimensions of said waveguide.

12. A method according to claim 10, where said substrate is made of glass and is free from rare-earth elements;
said step (c) comprises steps of:
  i) depositing a first film onto a surface of said substrate by an evaporation process;
  ii) forming a first mask by making openings in said first film to expose two first parts of said surface, said first mask being formed by a photolithographic process, said two first parts being situated at said two different positions in said substrate;
  iii) immersing said substrate in a first bath of molten salt to change the refraction index of said glass in said two first parts to form first and second gratings containing a rare-earth element, said first and second gratings constituting said first and second mirrors, said gratings being defined by the Bragg resonant equation which is:

$$\Lambda = \frac{\lambda}{2N},$$

where $\Lambda$ is a period of said gratings, $\lambda$ is an emission wavelength of said rare-earth element and N is an effective index of said waveguide; and
  iv) removing said first mask from said surface; and
said step (b) comprises steps of:
  v) depositing a second film onto said surface by an evaporation process;
  vi) forming a second mask by making openings in said second film to expose second parts of said surface, said second mask being formed by a photolithographic process; and
  vii) immersing said substrate in a second bath of molten salt to form said waveguide by diffusion, said waveguide having a refractive index different from the refractive index of said first and second gratings, said second bath having a temperature lower than the temperature of said first bath to prevent modification in dimensions of said gratings.

13. A method according to claim 12, wherein said substrate and said waveguide are free from said rare-earth element.

14. A method according to claim 13, wherein:
said second parts of said step (vi) comprise two longitudinal sections, each of said longitudinal sections having two extremities adjacent to an edge of said substrate one of said sections having two distinct areas adjacent to two distinct areas of the other of said sections; and
said first parts of said step (ii) comprise two portions of said second parts, said two portions being situated respectively on each of said longitudinal sections, between its two distinct areas.

15. A method according to claim 11, wherein:
said substrate is doped with said rare-earth element;
said molten salt of said first bath being different from said molten salt of said second bath to produce respectively different refractive indexes in said gratings and in said waveguide;
said openings of said second mask are perpendicular to said waveguide; and
said method further comprises, after said step (iv) and before said step (v), a step of immersing said substrate in a third bath of molten salt to bury said wave-guide.

16. A method according to claim 11, wherein said molten salt of said first bath contains said rare-earth element, and said diffusion of said step (iii) comprises a diffusion of said rare-earth element.

17. A method for making an optical waveguide device according to claim 10, wherein:
said substrate is made of glass and doped with a rare-earth element;
said step (b) comprises steps of:
(i) depositing a film onto a surface of said substrate by an evaporation process;
(ii) forming a mask by making openings in said film to expose parts of said surface, said mask being formed by a photolithographic process;
(iii) immersing said substrate in a bath of molten salt to form said waveguide by diffusion of said rare-earth element; and
(iv) removing said mask from said surface; and said step (c) comprises a step of:
(v) securing said mirrors respectively at both ends of said waveguide.

18. A method for making an optical waveguide device according to claim 10, wherein:
said substrate is made of glass and free from rare-earth element;
said step (b) comprises steps of:
(i) depositing a film onto a surface of said substrate by an evaporation process;
(ii) forming a mask by making openings in said film to expose parts of said surface, said mask being formed by a photolithographic process;
(iii) immersing said substrate in a bath of molten salt containing said rare-earth element to form said waveguide by diffusion of said rare-earth element; and
(iv) removing said mask from said surface; and
said step (c) comprises a step of securing said mirrors respectively at both ends of said waveguide.

* * * * *